Nov. 15, 1955 — R. T. ELLIOTT ET AL — 2,723,808
AUTO-SPINNER REEL
Filed July 17, 1952 — 3 Sheets-Sheet 1

INVENTORS
ROBERT T. ELLIOTT &
CLARENCE A. ELLIOTT
BY Gustave Miller
ATTORNEY

Nov. 15, 1955  R. T. ELLIOTT ET AL  2,723,808
AUTO-SPINNER REEL

Filed July 17, 1952  3 Sheets-Sheet 2

INVENTORS
ROBERT T. ELLIOTT &
CLARENCE A. ELLIOTT

BY Gustavo Miller

ATTORNEY

Nov. 15, 1955  R. T. ELLIOTT ET AL  2,723,808
AUTO-SPINNER REEL
Filed July 17, 1952  3 Sheets-Sheet 3

INVENTORS
ROBERT T. ELLIOTT &
CLARENCE A. ELLIOTT

BY *Gustav Miller*
ATTORNEY

United States Patent Office 2,723,808
Patented Nov. 15, 1955

2,723,808
AUTO-SPINNER REEL
Robert T. Elliott and Clarence A. Elliott, Paonia, Colo.

Application July 17, 1952, Serial No. 299,412

2 Claims. (Cl. 242—84.3)

This invention relates to a fishing reel and particularly to a reel which is adapted, by a simple adjustment, to act either as an automatic level winding reel or as a free spinning reel to allow the line to slip off the spool and on to the rod.

Heretofore, although spring powered reels have been used to automatically wind the line on the spool, and reels have been used to allow a free spinning action of the line as it is taken off the spool, both means have not, till now, been successfully combined in one mechanism.

It is, therefore, one object of this invention to provide a fishing reel which can act either as an automatic winding reel or as a free spinning reel to allow the fishing line to automatically slip off the spool.

Another object of this invention is to provide an improved driving means for rotating the reel.

Another object of this invention is to provide a means for automatically shifting the line during winding so that a level winding on the spool is obtained.

Other objects of this invention are to provide an improved device of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawings in which.

Figure 1:
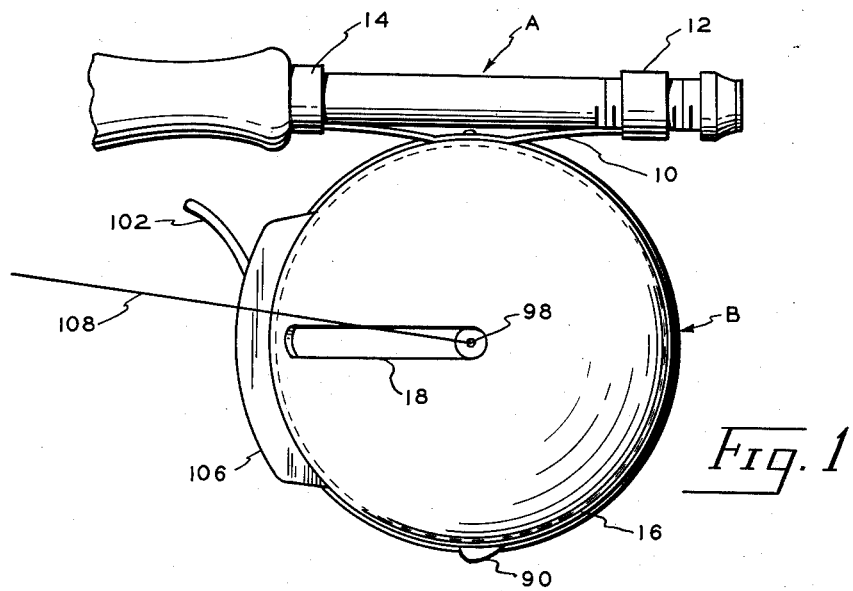
Fig. 1 is a front elevational view of the reel attached to a fishing rod.
Figures 2, 3:
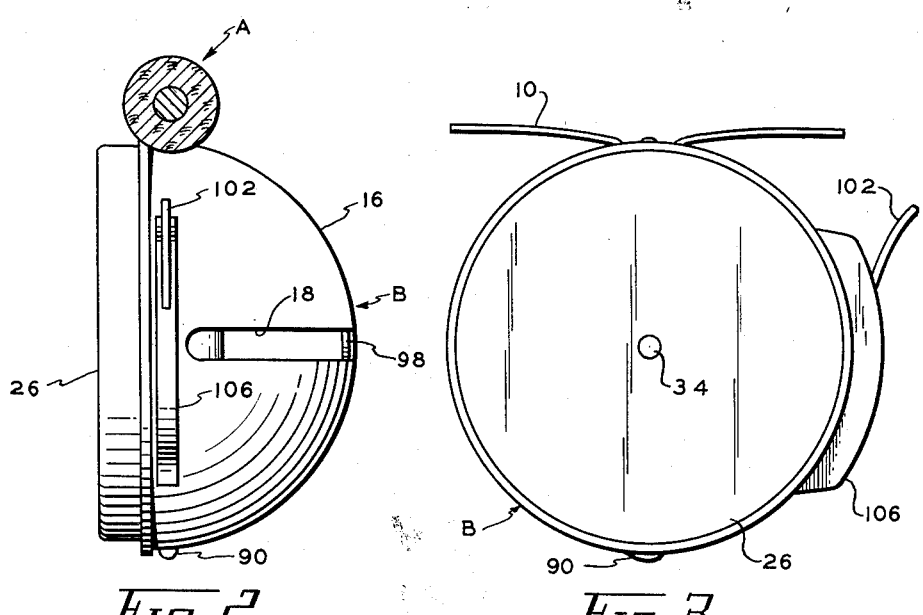
Fig. 2 is a side view of the reel showing it attached to the rod.
Fig. 3 is a rear elevational view of the reel.

Referring now in greater detail to the drawings wherein similar reference characters refer to similar parts, there is shown a rod A to which is attached a reel B by means of a saddle 10 riveted to the reel and having its ends connected in ferrules 12 and 14 on the rod. The ferrule 12 is screw-threaded to the rod so as to be longitudinally movable on the rod into release or clamping position of the saddle.

The reel B comprises a main hemispherical housing 16 having a slot 18 therein. The slot 18 extends approximately over a ninety degree arc. A wall 20 closes the straight side of the housing 16. A gear housing 22 is connected to the housing 16 by a flange 24 which fits between the inner periphery of the housing 16 and the outer periphery of the wall 20. A spring housing 26 is, in turn, rotatably connected to the housing 22 by means of a clamping collar 28. An opening 30 is formed in the wall 20 and a coinciding opening 32 is formed in the back wall of housing 22.

A shaft 34 extends through the opening 32 and is rotatably held in opening 36 in the back wall of housing 26. A spring 38 is located in housing 26, one end of the spring being connected to the housing as at 40 and the other end of the spring being connected to the shaft as at 42, so that when the housing 26 is rotated in one direction relative to the housings 16 and 22, the spring is wound up, storing up potential energy which can be used to rotate the shaft 34 when the spring is released.

Mounted on the shaft 34 within the housing 22 is a gear 44. Meshing with gear 44 is a gear 46 mounted on a shaft 48 which is fixed to the back wall of housing 22 and a pinion 50 mounted on a shaft 52 fixed to the same back wall. Also mounted on the shaft 52 is a gear 54 which meshes with a pinion 56 mounted on a shaft 58. The shaft 58 extends through the opening 30 in wall 20 and mounted on this shaft 58 within the housing 16 is located a spool 60 which is held on the shaft by a washer 62 and a cotter pin 64. The flange 66 of the spool has a larger diameter than the flange 68 so that when a line is to be wound on to the spool it can pass over the flange 68 but not over the flange 66.

A connecting rod 70 is connected at one end to the gear 46 and at the other end to a bent arm 72 which is pivoted at 74 to an ear 76 integral with the back wall of housing 22. A rod 78 is connected to the other end of the bent arm 72. The free end of the rod 78 extends through an opening in the wall 20 and is adapted to enter a recess 80 in a bail 82. The bail 82 is pivoted to the housing 16 as at 84 and has an off-set portion 86 which extends through an opening 88 in the housing 16. A finger 90 is connected to the portion 86. The end of the bail which extends beyond the portion 86 is bent at a forty-five degree angle as indicated at 92 and this bent end abuts against a flat spring 94 which is riveted to the wall 20 as at 96. A hole 98 is provided in the central portion of the bail 82 and when the bail is in free spinning position as shown in full line in Fig. 4, this hole coincides with hole 18 in the housing.

Figure 6:
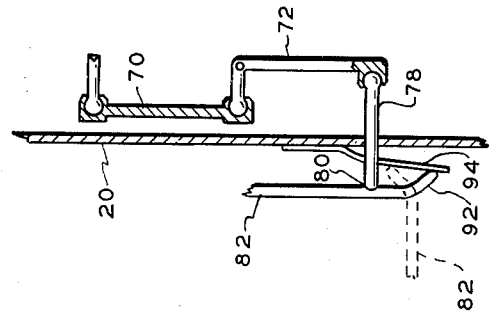
Fig. 6 is a view showing the relation between the crank arm mechanism and the line guide support means.
Figure 5:
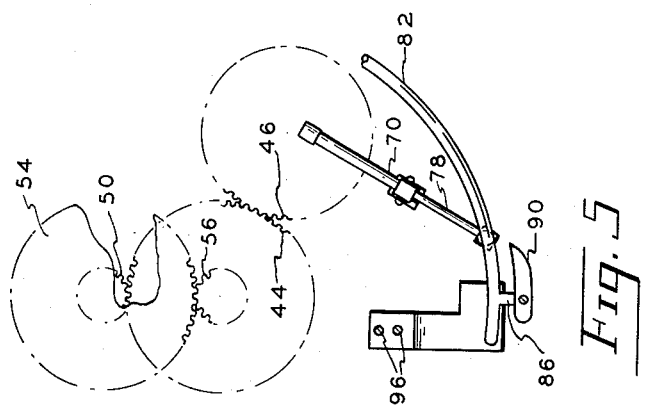
Fig. 5 is a view showing the connection between the gears and the line guide support means.

The bent end 92 of the bail abuts against the spring 94 in either its free spinning or its winding position. When the bail is in its free spinning position the spring acts as a detent to hold it in position. When the bail is in its winding position, the spring holds the bail against the rod 78 as shown in Fig. 6 of the drawings.

Figure 4:
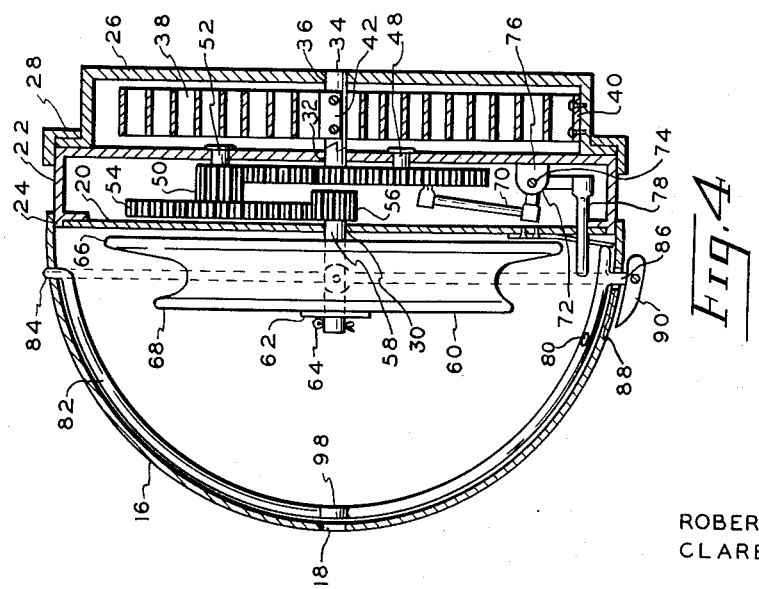
Fig. 4 is a sectional view of the reel.
Figure 7:
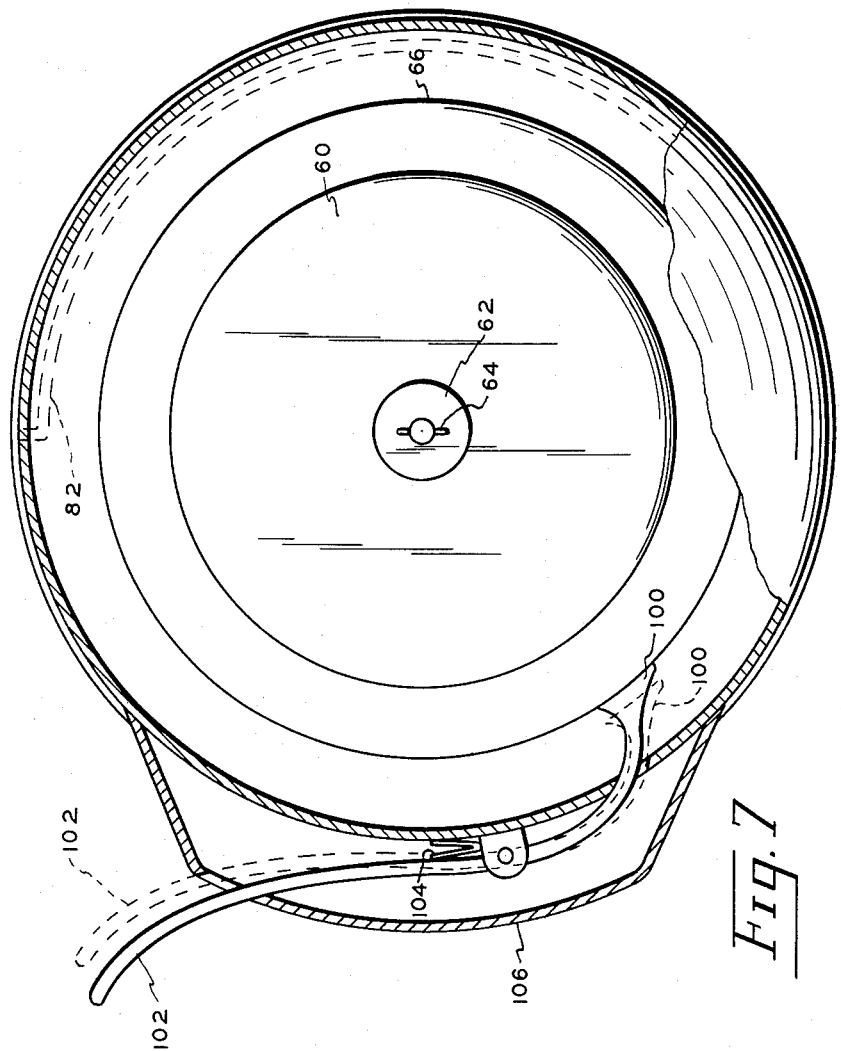
Fig. 7 is a view showing the brake shoe assembly.

In operation, when it is desired to play out the line or to place the reel in free-spinning position, the knob or finger piece 90 is turned to set the bail into its full line position as shown in Fig. 4 with the opening 98 mating with the end of the slot 18. A brake shoe 100 operated by a pivoted lever 102 is normally held against the spool 60 by a spring 104, the lever and spring being in a housing 106 through which the handle portion of the lever projects to the outside and the brake shoe portion to the inside of the housing 16. When paying out the line, said brake holds the spool and its associated mechanism stationary while the line spins freely over the spool flange 68, passing through guide opening 98 and slot 18. The elongation of the slot allows the line to be pulled laterally without being caught and snapped off by the housing. When it is determined that no more line should be payed out, the bail 82 with its opening 98, is switched to its dotted line position (Fig. 4) by means of the knob 90, thereby stopping the line from going out and making it ready to rewind.

When it is desired to rewind the line on the spool, the bail is turned to the position shown in outline in Fig. 4. The guide hole 98 is now at the other end of the slot, 90 degrees offset from its first position. The housing 26 is then rotated to place the spring 38 under tension. When line is rewound, the brake handle 102 is pressed against the spring 104 to release brake shoe 100 from the spool 60 and the spring 38, which has been placed under tension, acts to rotate the shaft 34. The shaft 34 then rotates the gear 44 which, in turn, rotates the gear 46 and the pinion 50. The pinion 50, in turn, rotates the shaft 52, which rotates the gear 54. The gear 54 rotates the pinion 56 connected to the shaft 58. The shaft 58 rotates the spool 60, drawing the line onto it. At the same time, the rotation of the gear 46 causes the connecting rod 70 and its associated mechanism to give a reciprocating motion to the bail 82 through the rod 78. In this way, the line is taken up on the spool through the reciprocating guide hole 98 causing the line to be wound on the spool in even layers or levels.

Although this invention has been described in considerable detail, such description is intended as being illustrative rather than limiting, since the invention may be variously embodied, and the scope of the invention is to be determined as claimed.

What is claimed as the invention is:

1. A fishing reel comprising a housing consisting of a spool housing portion, a gear mechanism housing portion and a coil spring housing portion, said spool housing portion comprising a hollow hemisphere and a straight wall closing its open side, a shaft journaled centrally through said straight wall, a spool mounted on one end of said shaft and located within said hemispherical portion, said gear mechanism housing portion consisting of said straight wall, a second wall spaced from and secured to said straight wall by a cylindrical peripheral wall therebetween, a gear mechanism consisting of a train of gears located within said gear mechanism housing portion, one gear of said train being mounted on the other end of said shaft within said gear mechanism housing portion, a second shaft, axially aligned with said first shaft, journaled through said second wall, another gear of said gear train mounted on one end of said second shaft located within said gear mechanism housing portion, a flanged trackway mounted on said second wall, said coil spring housing portion comprising a flanged cup rotatably mounted in said flanged trackway, a third shaft journaled in said flanged cup and axially aligned with said first two shafts, a coil leaf spring concentric with said shafts secured at one end to said third shaft and at its other end to said flanged cup, the other ends of said second and third shafts having cooperating ratcheted ends permitting said third shaft to be rotated relative to said second shaft in a spring winding direction and to lock to said second shaft in a power delivering spring unwinding direction to operate said gear train and rotate said spool, the peripheral surface of said spool being curved in cross section, the flange on the side of said spool nearer to the axial center of said hemisphere having a lesser diameter than the other flange thereof, a slot in said hemispherical housing portion extending radially from its axial center to one side thereof, a fishing line guide support means diametrically pivoted within said hemispherical housing portion, a guide opening in said support means, said guide opening being arranged to coincide with either end of said radially extending slot when said support means is pivoted from a first position to a second position, said guide opening being further arranged, when in one position of adjustment, to guide a fishing line which passes from said spool out through said slot and on to a fishing rod and, when in a second position of adjustment, to guide said line back on to said spool.

2. The device of claim 1 wherein said support means is provided with an extension which projects through an opening in said housing, and a finger piece on said extension to rotate said support means from said first to said second position.

References Cited in the file of this patent

UNITED STATES PATENTS

| | | |
|---|---|---|
| 2,116,959 | Brown et al. | May 10, 1938 |
| 2,321,650 | Burdick | June 15, 1943 |
| 2,344,209 | Lowe | Mar. 14, 1944 |
| 2,551,320 | Ferguson | May 1, 1951 |
| 2,590,369 | Beeler | Mar. 25, 1952 |
| 2,617,611 | Meierjohan | Nov. 11, 1952 |
| 2,630,978 | Skarbek | Mar. 10, 1953 |